Jan. 2, 1968   P. A. TAYSOM   3,360,808
WIRE-WRAPPING TOOLS

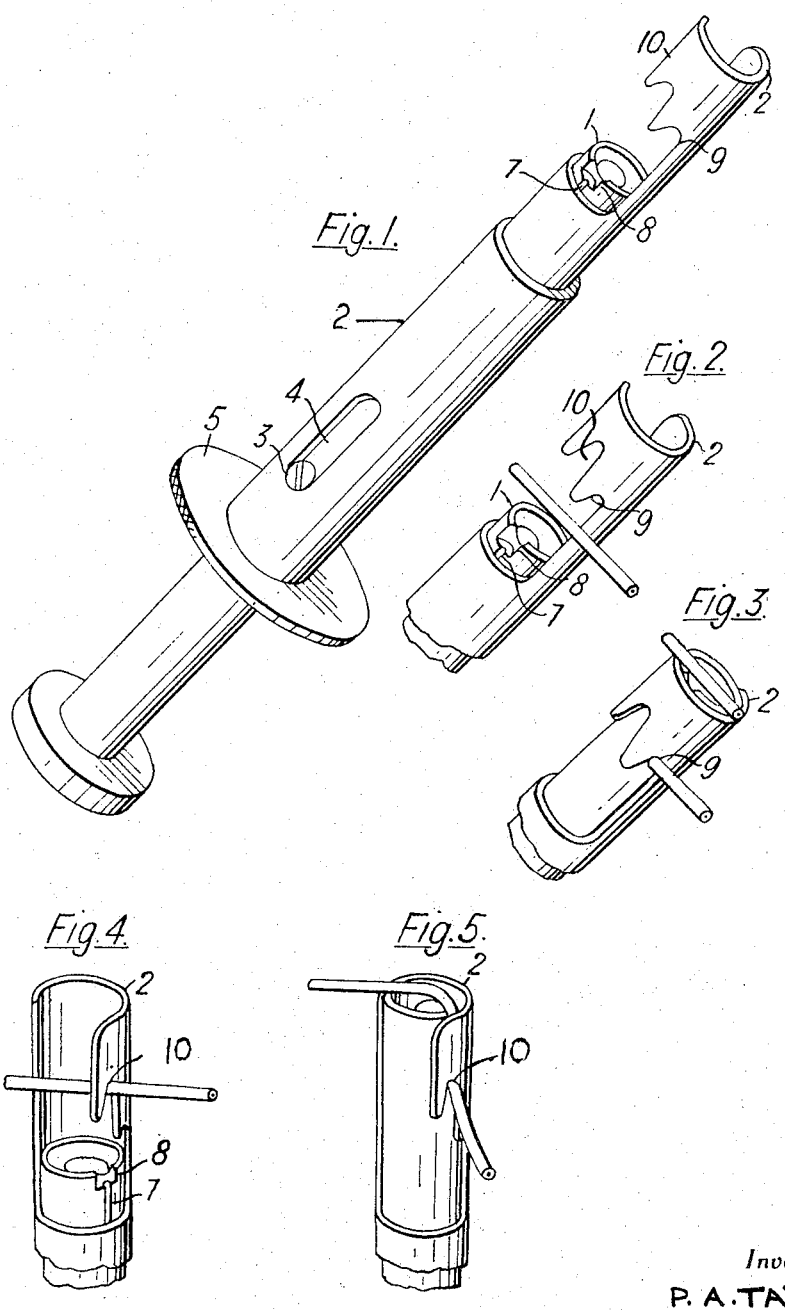

Filed July 26, 1966   2 Sheets-Sheet 2

Inventor
P. A. TAYSOM
By Robert S. Crooke
Attorney

United States Patent Office

3,360,808
Patented Jan. 2, 1968

3,360,808
WIRE-WRAPPING TOOLS
Patrick Arnold Taysom, London, England, assignor to International Standard Electric Corporation, New York, N.Y., a corporation of Delaware
Filed July 26, 1966, Ser. No. 567,956
Claims priority, application Great Britain, Aug. 3, 1965, 33,186/65
4 Claims. (Cl. 7—14.1)

The present invention relates to a wire stripper, i.e. to a tool for stripping insulating material off a wire, and especially to a wire-wrapping tool which is combined with such a stripper.

It is an object of this invention to provide a tool capable of cutting a length of wire from a reel, stripping the insulation from a portion of the end of said length of wire, and wrapping said stripped portion of the end of the wire around a terminal to which the wire is connected, such as a terminal of a printed-circuit board.

According to the present invention there is provided a wire-stripping tool, which includes a first sleeve-like member closely fitting within a second sleeve-like member, said second member being longitudinally but not rotationally movable with respect to said first member, a notch at one end of said second member and having a cutting edge which faces toward the other end of said member, and a groove extending along part of the length of the outer surface of said first member in alignment with said notch. This groove has a width and depth such as to accommodate the wire to be stripped but not the insulation to be removed therefrom, and has a widened portion at the end of said first member adjacent to said one end of said second member, for stripping the insulation off a length of wire. The wire is placed in said notch when said one end of said second member is clear of the adjacent end of said first member, whereafter relative axial movement of said two members bends the wire over the end of said first member and forces it into said groove and said widened portion, said notch stripping the insulation as the wire is forced into said groove.

An embodiment of the invention will now be described with reference to the accompanying drawings, in which:

FIGURE 1 is a perspective view of a combined wire-wrapping bit and stripping tool;

FIGURES 2 through 5 show, in perspective fashion, several stages in the cutting and stripping operations;

Referring first to FIGURE 1, the "business end" of the tool, whose driving motor is not shown, consists essentially of a sleeve 1, which forms the wrapping bit, and a stripping and cutting sleeve 2 which is concentric with the sleeve 1 and keyed to it by a bolt 3. The sleeve 2 is slotted at 4 so that it can be moved axially with respect to the sleeve 1. To enable this movement to be effected by hand, a sleeve 2 has a disc-shaped grip 5 at its innermost end.

Figure 6:
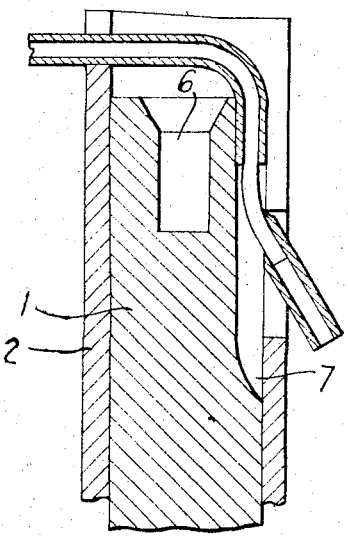
FIGURE 6 is a cross-section of the device which corresponds to the stage shown in FIGURE 5.
Figure 7:
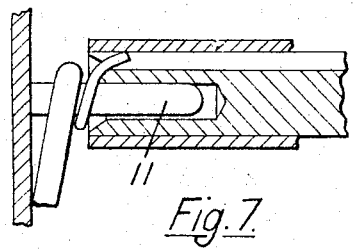
FIGURE 7 is a cross-section of the device during wrapping.

The sleeve 1 which constitutes the wrapping bit is similar to a conventional wrapping bit in several respects. Thus it has a central hole 6, FIGURE 6, into which a terminal on which a wire is to be wrapped can be inserted as shown in FIGURE 7. However, the sleeve 1 has a groove 7 which runs axially along its outer surface and which is just wide enough and deep enough to receive the wire which the tool is intended to wrap, without its insulation. At its outermost end, this groove 7 has a widened portion or step 8, whose dimensions are such that it can receive the wire with its insulation.

Near one end of the sleeve 2, there are two notches 9 and 10, of which the notch 9 acts as a wire cutter, as will be seen. The notch 10, which is aligned with the groove 7, cooperates with the groove to act as a stripper.

The operation of the device will now be described with reference to FIGURES 2 through 7.

First, the outer sleeve 2 is pushed forward so that its notches 9 and 10 are clear of the end of the sleeve 1. The wire to be stripped and wrapped is then laid in the cutting notch, as shown in FIGURE 2, after which the sleeve 2 is retracted, the cutting edge of the notch 9 then cutting the wire and its insulation. This condition is shown in FIGURE 3.

To strip the insulation off the portion of the wire to be wrapped, the sleeve 2 is pushed forward again and the wire is moved to the other notch 10. Then when the sleeve is retracted, the wire is bent at right angles over the end of the wrapping bit, the insulation being forced into the step 8. In addition, the wire is forced into the axial groove 7, the notch 10 tearing the insulation and stripping it off. This operation is represented in FIGURES 4, 5 and 6. In FIGURE 6 the insulation can be seen forced into the step 8, with the wire being forced into the groove 7. The insulation to be stripped off is shown partly removed.

To wrap the wire, the sleeve 2 is held in its rearward position, and the terminal to receive the wrap is inserted into the hole 6, as shown at 11, FIGURE 7. This would normally be done by fitting the end of the bit over the terminal. Then the driving motor is switched on to wrap the wire on the terminal. Alternatively, if the tool is a manual device, hand operation is used. If the wrapped joint is to be subsequently soldered, one or two turns are wrapped, while for a solderless joint six or eight turns would be wrapped.

Figure 8:
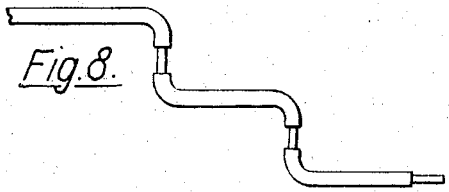
FIGURE 8 shows a piece of wire which has been bent in several places when using the device as a stripper only.

The tool can be used, of course, for cutting the wire and stripping the insulation off its end, without wrapping, or for cutting and baring the wire at intervals along its length as shown in FIGURE 8.

The arrangement used to cut and strip as described herein allows the wire to be fed into the tool at 90° to the axis of the bit, which simplifies and speeds the operation. Further, as the insulation is completely stripped before wrapping, friction between the wire and the insulation does not influence the tension of the wire during wrapping.

It is to be understood that the foregoing description of specific examples of this invention is given by way of example only, and is not to be considered as a limitation on its scope, which is defined in the appended claims.

What I claim is:

1. A wire-stripping tool, which includes first and second sleeve-like members, said first sleeve-like member closely fitting within said second sleeve-like member, said second member being longitudinally but not rotationally movable with respect to said first member, said second member having an end portion formed as an extension thereof and defining a segment of a cylinder, said extension having a notch near one end thereof, said notch having a cutting edge which faces toward the other end of said second member, a groove extending along part of the length of the outer surface of said first member in alignment with said notch, said groove having a width and depth sufficient to accommodate the wire to be stripped but not the insulation to be removed therefrom, said groove having at the end of said first member a widened portion adjacent to said end portion of said second member for cooperating with said notch to strip the insulation off a length of wire placed in said notch when said end portion of said second member extends beyond the adjacent end of said first member, said first and second members cooperating through the axial relative movement between said two members to bend the wire over the end of said first member and force it into said groove and said widened portion.

2. A tool as defined in claim 1, in which said sleeve-like members are both right cylinders, and further including a pin whose end is journalled in said first member, said second sleeve-like member having a longitudinally extending slot for accommodating said pin.

3. A tool as in claim 1, in which said second sleeve-like member has a second notch at said one end with a cutting edge facing towards the other end of said second sleeve-like member, said second notch being out of alignment with said groove and having a sharp edge for cutting wire.

4. A combined wire-wrapping, wire-cutting and wire-stripping tool, which includes an inner cylindrical member having an axial hole for the reception of a terminal to be wrapped, and having a lengthwise groove on the outer surface of said inner cylindrical member whose width and depth are such as to accommodate the wire to be wrappet but not its insulation, said groove having a widened portion at the same end of said inner cylindrical member as said axial hole, which portion can accommodate the wire with its insulation, and an outer cylindrical member keyed to said inner cylindrical member so as to be rotatable therewith but axially slidable with respect thereto, said outer cylindrical member having an end portion formed as an extension thereof and defining a segment of a cylinder which in one extreme position in the axial relative movement of said outer cylindrical member is clear of the end of said cylindrical member with said axial hole, said end portion having a first notch with a cutting edge which faces toward the other end of said outer cylindrical member, said first notch being out of alignment with said groove for cutting wire placed between said first notch and the end of said inner cylindrical member, said end portion of said outer cylindrical member having a second notch with a cutting edge facing toward the other end of said outer cylindrical member, for stripping wire placed therein and for bending the wire over the end of said inner cylindrical member and forcing the wire and insulation into said widened portion and the wire into said groove by said axial relative movement between said inner cylindrical member and said outer cylindrical member, said second notch in said outer cylindrical member cooperating with the end of said inner cylindrical member to retain a portion of said wire in said groove while another portion of said wire is wound up on said terminal by rotation of said tool with respect to said terminal.

References Cited
UNITED STATES PATENTS

| | | | |
|---|---|---|---|
| 2,765,684 | 10/1956 | Reck. | |
| 2,793,419 | 5/1957 | Larsen. | |
| 3,006,563 | 10/1961 | Bos et al. | 140—124 X |
| 3,246,381 | 4/1966 | Etchison et al. | 29—33.10 |

OTHELL M. SIMPSON, *Primary Examiner.*

R. V. PARKER, JR., *Assistant Examiner.*